(12) United States Patent
Bassett et al.

(10) Patent No.: US 11,069,153 B1
(45) Date of Patent: Jul. 20, 2021

(54) APPARATUS AND METHOD FOR CREATING BESPOKE EYEWEAR

(71) Applicant: FITZ FRAMES, INC., Santa Monica, CA (US)

(72) Inventors: Katherine M. Bassett, Santa Monica, CA (US); Gabriel Schlumberger, Santa Monica, CA (US); Nathan R. Sawyer, Santa Monica, CA (US)

(73) Assignee: Fitz Frames, Inc., Santa Monica, CA (US)

( * ) Notice: Subject to any disclaimer, the term of this patent is extended or adjusted under 35 U.S.C. 154(b) by 0 days.

(21) Appl. No.: 16/798,178

(22) Filed: Feb. 21, 2020

Related U.S. Application Data (60) Provisional application No. 62/808,519, filed on Feb. 21, 2019.

(51) Int. Cl.
*G06T 19/20* (2011.01)
*G06T 17/20* (2006.01)
*G06K 9/00* (2006.01)
*B33Y 80/00* (2015.01)
*B33Y 50/00* (2015.01)
*G02C 13/00* (2006.01)

(52) U.S. Cl.
CPC .............. *G06T 19/20* (2013.01); *B33Y 50/00* (2014.12); *B33Y 80/00* (2014.12); *G02C 13/005* (2013.01); *G06K 9/00268* (2013.01); *G06T 17/20* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 7,639,267 B1 * | 12/2009 | Desimone | G06T 15/00 345/619 |
| 10,558,770 B1 * | 2/2020 | Kanthasamy | G06F 30/23 |
| 2005/0162419 A1 * | 7/2005 | Kim | G06T 15/00 345/419 |
| 2018/0017815 A1 * | 1/2018 | Chumbley | G02C 5/12 |

* cited by examiner

*Primary Examiner* — Frank S Chen
(74) *Attorney, Agent, or Firm* — Cooley LLP (57) ABSTRACT

A computer implemented method includes receiving eyewear parameters to form received eyewear parameters. A current computer model of eyewear is modified in accordance with an eyewear parameter that necessitates alteration of the current computer model to form a new computer model of the eyewear. The new computer model of the eyewear includes an altered hierarchical set of interconnected elements defining a rig and an altered surface representation around the rig defining a mesh that is manifold. The modifying operation is repeated for each eyewear parameter of the received eyewear parameters that necessitates alteration of the new computer model to form an output manifold mesh. Bespoke eyewear is manufactured from the output manifold mesh.

11 Claims, 6 Drawing Sheets

1. PD
2. Face width
3. Center of PD line on nose to top of ear on right side (temple)
4. Center of PD line on nose to top of ear on left side (temple)
5. Center of nose to pupil (L) (on a perfectly symmetrical person this would be exactly half of the PD)
6. Center of nose to pupil (R)
7. Bridge width - measured where nose pads would rest
8. Bridge depth - from center of where nose pads would rest (same point as above) to plane of face/cheek
9. Bridge angle - angle of plane of nose at the point where the nose pads would rest (same point as 7 and
10. Ear to Eye offset angle (informs Pantoscopic tilt) right side
11. Ear to Eye offset angle (informs Pantoscopic tilt) left side

APPARATUS AND METHOD FOR CREATING BESPOKE EYEWEAR

CROSS-REFERENCE TO RELATED APPLICATION

This application claims priority to U.S. Provisional Patent Application Ser. No. 62/808,519, filed Feb. 21, 2019, the contents of which are incorporated herein by reference.

FIELD OF THE INVENTION

This application relates generally to eyewear. More particularly, this invention is directed toward techniques for creating bespoke eyewear.

BACKGROUND OF THE INVENTION

It is important for eyewear frames to fit each individual with comfort and stability during use and especially during movement. It is especially important for corrective eyewear frames to fit well in order to keep corrective lenses accurately positioned in relation to the eyes, since misaligned lenses will not maintain their corrective nature. It is also important to optimize the fit and therefore comfort of corrective eyewear frames since they are usually worn for long periods. Well-fitted eyewear frames help to insure a wearer will maintain use as much as medically recommended.

Eyewear can be designed using computer-aided design (CAD). CAD uses a computer to aid in the creation, modification, analysis or optimization of a design, such as a set of eyeglasses. CAD software for a mechanical design, such as eyewear, uses either vector-based graphics to depict the objects or raster graphics showing the overall appearance of a designed object. Commercially available CAD software includes Rhino 3D® sold by Robert McNeel & Associates, Seattle, Wash., PTC Creo Elements®, sold by PTC, Boston, Mass. and Solidworks®, sold by Dassault Systemes, Velizy-Villacoublay, France. These packages use a hierarchy of steps to create parameterized geometry, each having a mathematical definition. However, for objects with complex shapes and curves, these packages do not easily allow for dimensional modifications after the initial design, which is required for creating custom objects. More particularly, such products require deformations or dimensional modifications to be applied to a specific mathematical step in a hierarchy, making it difficult or complicated to understand how that modification will affect all later steps and therefore how it will affect the resulting model. With these traditional engineering tools, any attempt at making dynamic dimensional modifications or deformations of a model involving complex curves (as required by resizing a single eyewear style for many different sets of measurements or people) is extremely difficult. The difficulty stems from the hierarchical dependencies and stacks that require dimensional or structural modifications to be thoroughly defined, often in the original creation of the model itself. If dynamic modifications are made, they often have issues with maintaining a manifold shape (i.e., continuous surface without any openings) or preserving the integrity of the surfaces of the original model. Modifications also often need to have a specific mathematical definition, which makes complicated surfaces difficult to create and manipulate.

Thus, there is a need to easily deform and modify any eyewear model in a way that not only results in a style-preserving resizing of any dimension of the frame, but also results in a manifold shape conducive to a digital model that can be manufactured.

SUMMARY OF THE INVENTION

A computer implemented method includes receiving eyewear parameters to form received eyewear parameters. A current computer model of eyewear is modified in accordance with an eyewear parameter that necessitates alteration of the current computer model to form a new computer model of the eyewear. The new computer model of the eyewear includes an altered hierarchical set of interconnected elements defining a rig and an altered surface representation around the rig defining a mesh that is manifold. The modifying operation is repeated for each eyewear parameter of the received eyewear parameters that necessitates alteration of the new computer model to form an output manifold mesh. Bespoke eyewear is manufactured from the output manifold mesh.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
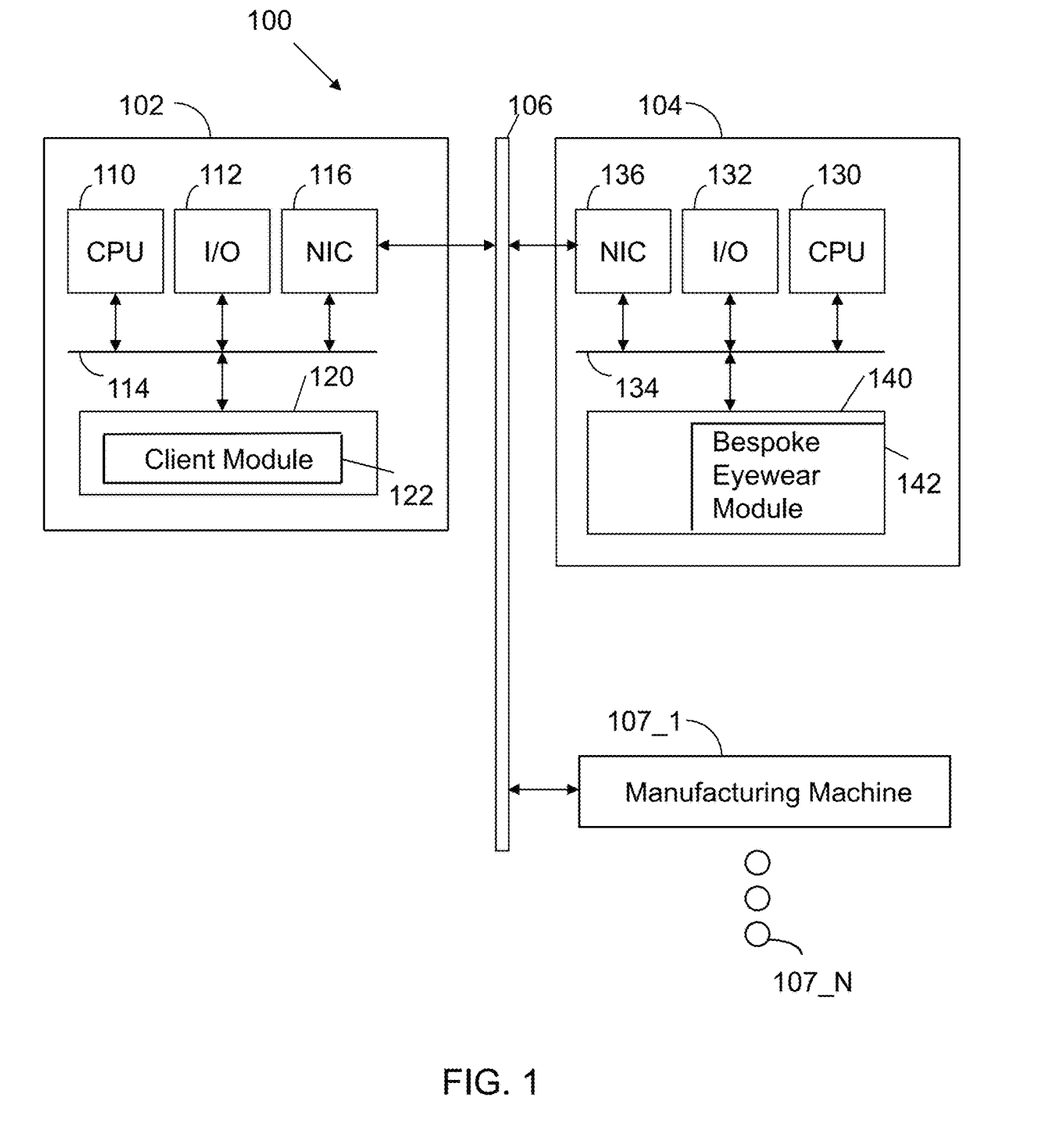
FIG. 1 illustrates a system configured in accordance with an embodiment of the invention.

FIG. 1 illustrates a system 100 configured in accordance with an embodiment of the invention. The system 100 includes a client machine 102 connected to a server 104 via a network 106, which may be any combination of wired or wireless networks. The client machine 102 includes a processor (e.g., a central processing unit) 110 and input/output devices 112 connected via a bus 114. The input/output devices may include a keyboard, mouse, touch display, device camera and the like. A network interface circuit 116 is also connected to the bus 114 to provide connectivity to network 106. A memory 120 is also connected to the bus 114. The memory 120 stores instructions executed by processor 110. In particular, the memory 120 stores a client module 122 that is used to communicate with server 104. The client module 122 includes instructions executed by processor 110 to provide prompts to a user that guides the user through a process of selecting bespoke eyewear. The bespoke eyewear is derived from eyewear parameters collected by the client module 122 and sent to server 104. Alternately, or in addition, some of the eyewear parameters may be sent by another machine or may be default parameters stored at server 104. The eyewear parameters may include anatomical facial measurements, eyewear frame style parameters, custom detail or feature parameters and corrective lens parameters.

Server 104 receives the eyewear parameters to form received eyewear parameters. Server 104 includes a processor 130, input/output devices 132, a bus 134 and a network interface circuit 136. A memory 140 is connected to bus 134. The memory 140 stores a bespoke eyewear module 142 with instructions executed by processor 130. The bespoke eyewear module 142 uses computer animation tools in the process of specifying bespoke eyewear.

That is, the current invention does not use CAD to design eyewear. Rather, computer animation software is used. Computer animation software digitally generates animated images. The illusion of movement is created by displaying an image and repeatedly replacing it with a new image that is similar to it, but is advanced slightly in time (usually at a rate of tens of frames per second). Each image is represented in two parts. First, a surface representation is used to draw the object. The surface representation is referred to as a mesh. Second, a hierarchical set of interconnected elements called a skeleton or rig is used to animate the mesh. The mesh surrounds the rig. Attaching the mesh to a rig is referred to as skinning.

To generate a design that can be manufactured, the mesh must be manifold, meaning that the mesh of the object must be entirely encoded and continuous and therefore not have any holes or open edges that would result in an error when translating to a physical object. The disclosed system maintains the manifold quality of an eyewear model throughout resizing processes. This results in a useful set of parameters that do not need to be fixed through manual processing. More particularly, the disclosed system resizes an eyewear frame style based on a set of measurements, but it can also output the required three-dimensional model as a digital file type for most methods of manufacturing. Manufacturing methods include, but are not limited to injection molding, casting, subtractive manufacturing (e.g., computer numeric control machining) and additive manufacturing through three-dimensional printing, such as selective laser sintering (SLS), fused deposition modeling (FDM), and metal fusion. These file types include .obj files, .stl files and .3mf files.

The bespoke eyewear module 142 modifies a current computer model of eyewear in accordance with an eyewear parameter that necessitates alteration of the current computer model to form a new computer model of the eyewear. The new computer model of the eyewear includes an altered hierarchical set of interconnected elements defining a rig and an altered surface representation around the rig defining a mesh that is manifold. The modifying operation is repeated for each eyewear parameter of the received eyewear parameters that necessitates alteration of the new computer model to form an output manifold mesh. Bespoke eyewear is manufactured from the output manifold mesh. The output manifold mesh is a digital file defining a three-dimensional model for manufacturing.

FIG. 1 illustrates different manufacturing machines 107_1 through 107_N connected to network 106. Each manufacturing machine is available to manufacture bespoke eyewear from the output manifold mesh produced by the bespoke eyewear module 142. Example manufacturing machines include an injection molding machine, a casting machine, a subtractive processing machine (e.g., computer numeric control machine) and an additive manufacturing machine utilizing three-dimensional printing.

Figure 2:
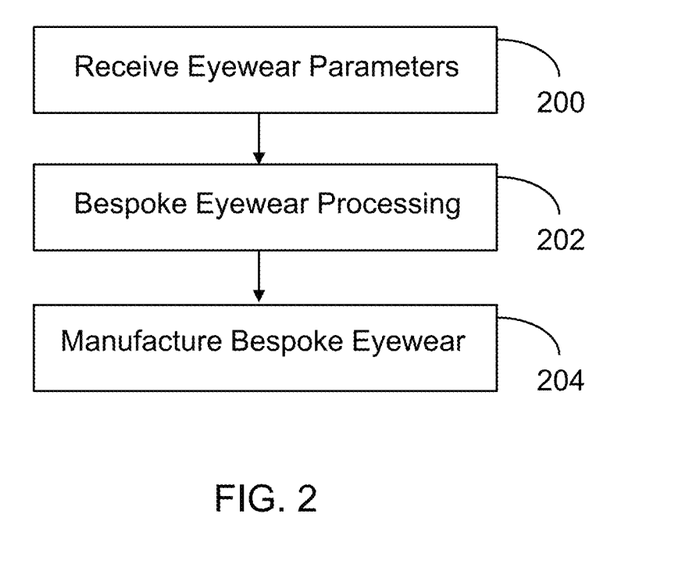
FIG. 2 illustrates processing associated with an embodiment of the invention.
Figure 3:
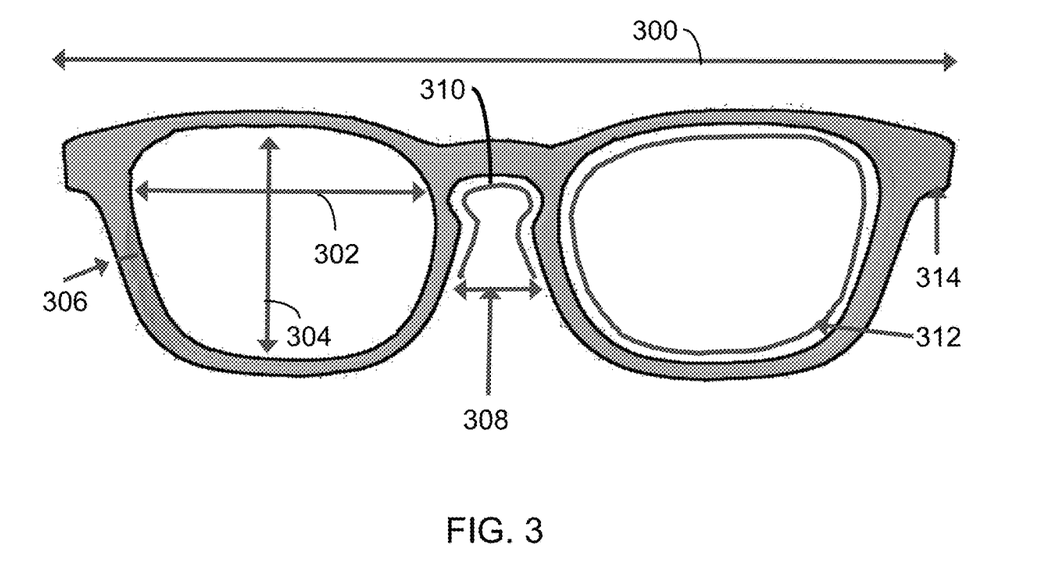
FIG. 3-5 illustrate eyewear measurements processed in accordance with embodiments of the invention.

FIG. 2 illustrates processing operations associated with an embodiment of the invention. Initially, eyewear parameters are received 200. As previously indicated, server 104 receives eyewear parameters from client device 102 or other sources to form received eyewear parameters. The received eyewear parameters may include eyewear frame style parameters. FIG. 3 illustrates eyewear frame style parameters that include overall eyewear width 300, a horizontal or A dimension 302, a vertical or B dimension 304, a frame thickness 306, a nose bridge width 308, a nose bridge shape 310, an eyewire shape 312 and an outer eyewear tip or wing shape 314.

Figure 4:
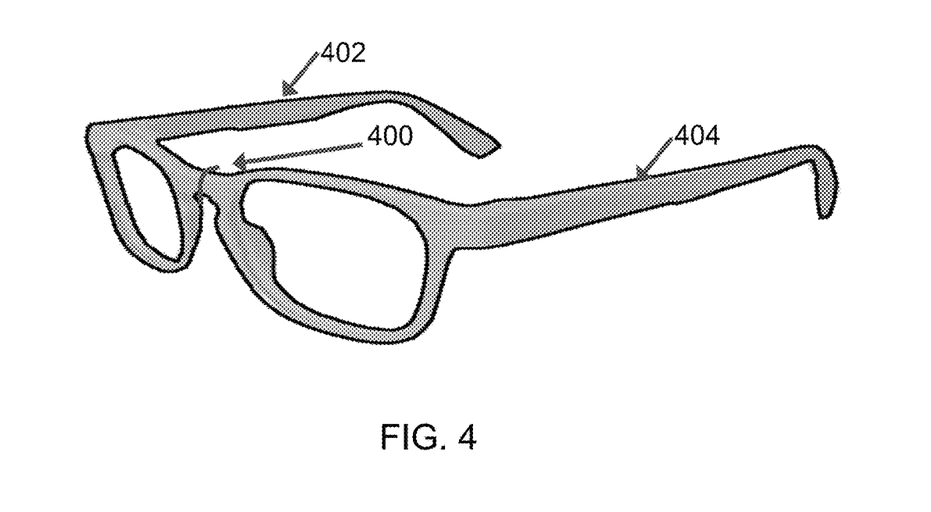

FIG. 4 illustrates an additional eyewear frame style parameter in the form of an edge profile 400. FIG. 4 also illustrates a right temple shape 402 and a left temple shape 404.

Figure 5:
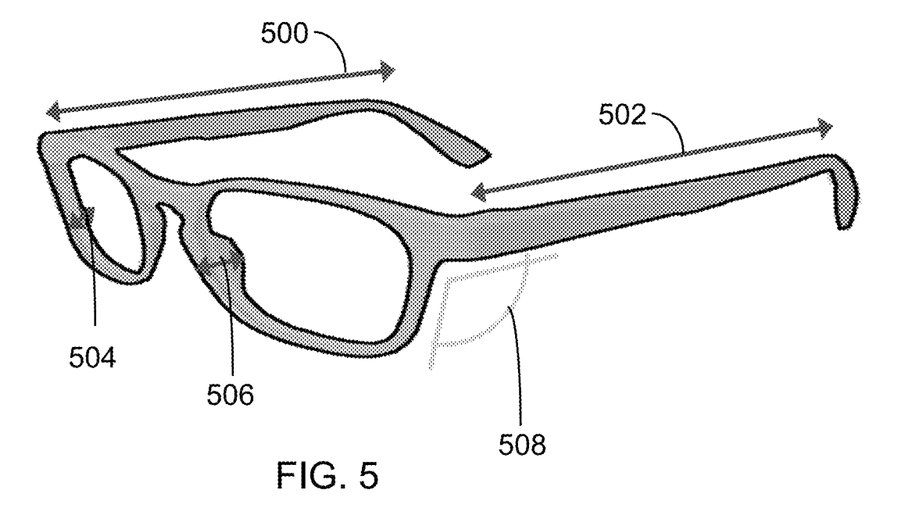

FIG. 5 illustrates eyewear frame style parameters that include a right temple length 500, a left temple length 502, eyewire depth 504, nose pad depth 506 and left pantoscopic tilt 508 (right pantoscopic tile, not shown, may also be used).

Figure 6:
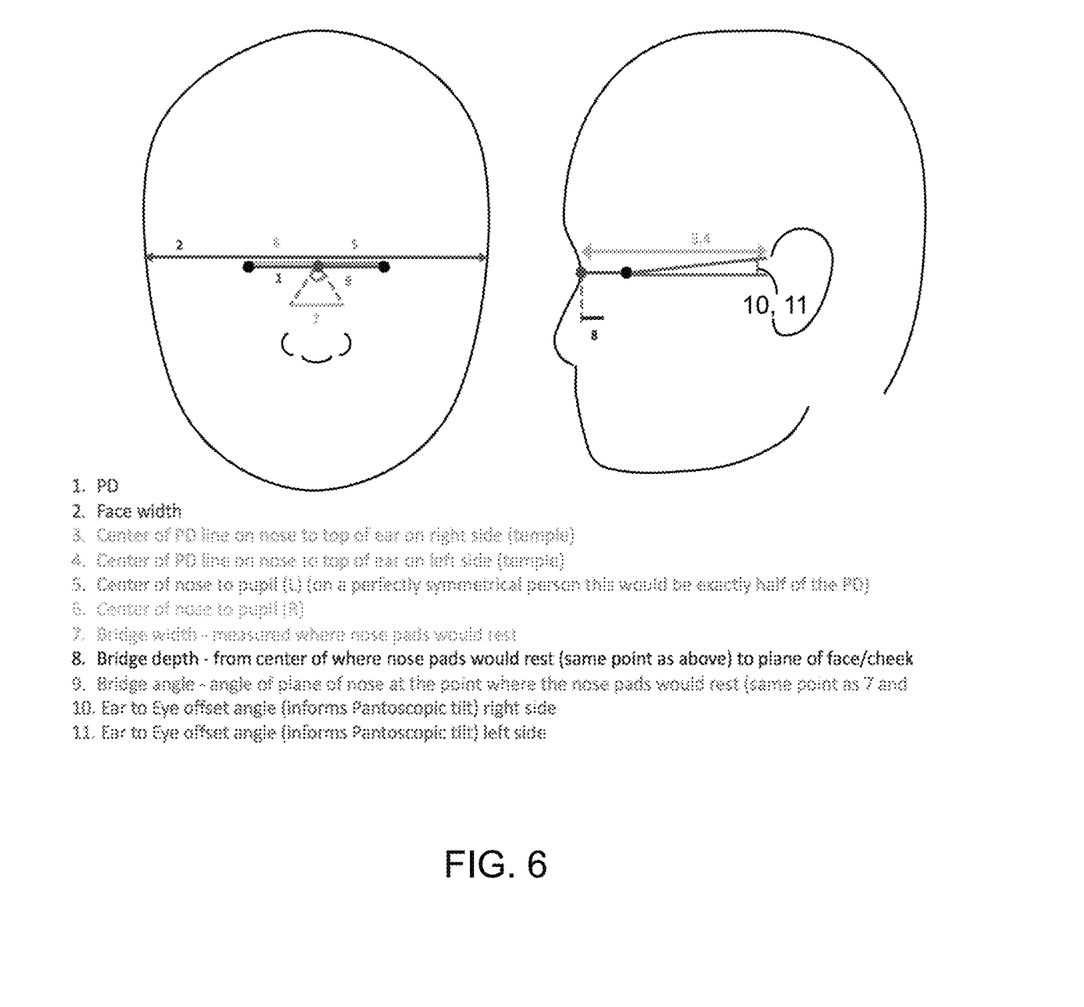
FIG. 6 illustrates anatomical facial measurements processed in accordance with embodiments of the invention.

The received eyewear parameters may also include anatomical facial measurements. For example, the camera on client device 102 may be used to capture an image of a face. From the image, anatomical facial measurements may be derived. FIG. 6 illustrates exemplary parameters that may be processed in accordance with embodiments of the invention. Line segment 1 of FIG. 6 is pupillary distance (PD). Line segment 2 is face width. Line segments 3, 4 are center of PD line on nose to top of ear on right side temple, and left side temple. Line segment 5 is center of nose to pupil left (on a perfectly symmetrical person this would be exactly half of the PD). Line segment 6 is center of nose to pupil right. Line segment 7 is bridge width measured where nose pads would rest. Line segment 8 is bridge depth from center of where nose pads would rest to plane of face or cheek. Element 9 is bridge angle, which is the angle of the plane of the nose at the point where the nose pads would rest. Angle 10, 11 is ear to eye offset angle (informs pantoscopic tilt) for the right side and left side.

The received eyewear parameters may also include corrective lens parameters. The corrective lens parameters include corrective prescription values, such as numerical values of the corrective lenses, usually obtained in a prescription from an optical professional (optician, ophthalmologist, optometrist etc.). These values typically include sphere, cylinder, axis, vertical prism, horizontal prism or addition, and type of lens to be used (can be chosen by wearer or optical professional, e.g. high index, polycarbonate, etc.) for the right and the left side. These values can be converted into lens edge thickness values.

Figure 7:
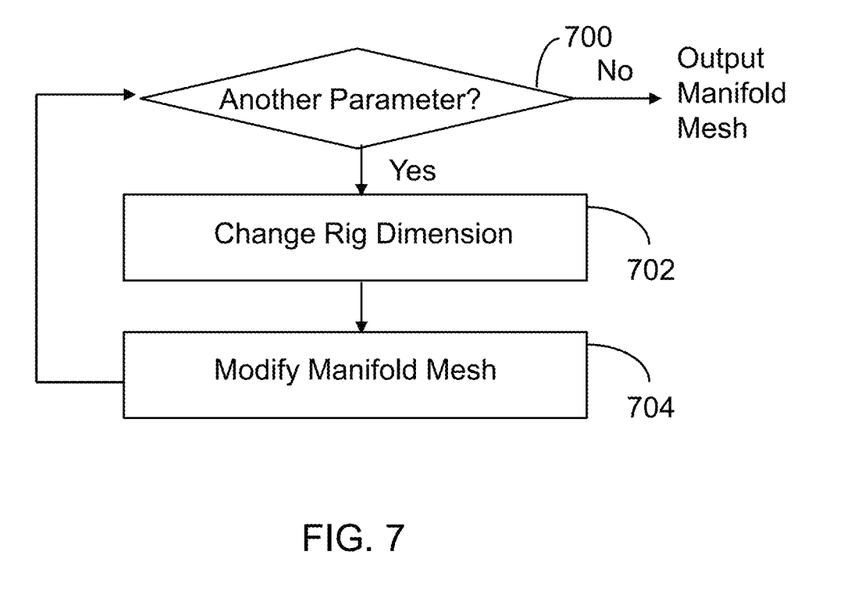
FIG. 7 illustrates bespoke eyewear processing performed in accordance with an embodiment of the invention.

Returning to FIG. 2, the next operation is bespoke eyewear processing 202. This is implemented with bespoke eyewear module 142. FIG. 7 illustrates processing associated with bespoke eyewear module 142. It is determined whether an eyewear parameter of the received eyewear parameters necessitates alteration of a current computer model of eyewear. If so (700—Yes), a rig dimension is changed 702. Thereafter, the manifold mesh is modified 704 to accommodate the rig dimension change. This loop is repeated for each eyewear parameter of the received eyewear parameters that necessitates alteration of the latest computer model. When no new parameters need to be processed (700—No), an output manifold mesh is delivered. The output manifold mesh is a digital file defining a three-dimensional model for manufacturing.

Returning to FIG. 2, the final operation is to manufacture bespoke eyewear 204. The bespoke eyewear may be manufactured on one or more of machines 107_1 through 107_N.

The disclosed system uses the concept of creating a rig for a digital model and skinning the model to that rig, for example using weighted points. This concept is known in the computer animation industry where it is used to create and control deformations of a digital model while it is digitally animated or moved across time, resulting in a series of digital pictures or frames of animation. However, the disclosed system uses the concept of rigging a model to instead control deformations required for resizing the static model of an eyewear frame intended for direct translation and manufacturing in the physical world. There are several standard animation software packages that include a platform to create a model, rig and skin, including Maya® and 3DS Max® each sold by Autodesk, Inc., San Rafael, Calif., and open source code Blender® from the Blender Foundation.

In one embodiment, a digital three-dimensional (3D) model of a base size (or any size) of a frame style is created as a static manifold shape. A rig is then applied to the model. One of the advantages of this system is that one can create a general rig that can be applied to any style of eyewear frame. As previously indicated, a rig can be thought of as a bone structure or skeleton-like grouping of spatially or mathematically defined constraints. One way of applying a rig to a 3D model is called 'skinning.' This is the way in which a user defines the way the rigging constraints will influence a model or parts of a model as the rig is modified, moved or deformed. One type of skinning assigns mathematical weights or values of influence to each surface point of a digital model. This allows for gradients of influence (as well as hard borders) across a surface, which can result in smooth deformations used to maintain the manifold quality of the resulting 3D model.

By utilizing the concepts of rigging and skinning, the disclosed system supplies a way to deform and modify any eyewear model in a way that not only results in a style-preserving resizing of any dimension of the frame, but also in a manifold shape and in the form of a digital model that can be used for manufacturing.

As previously indicated, received eyewear parameters are processed by the bespoke eyewear module 142, which includes a digital rig/model file for the base model or base size for desired style of eyewear frame. The received eyewear parameters are passed to the rig/model file. This can be done automatically through programming code or 'scripting' when the file is chosen and opened, or it can be done manually by a user using a software package. The rig is resized in each dimension in a determined order based on the independence requirement of each measurement. This order is determined by the requirements of maintaining the qualities of the eyewear style as well as the relationship between measurements, be it anatomical or otherwise. For example, in one embodiment the system resizes the width of the eyewear frame first using a global growth or shrink of the entire model to maintain the eyewear style elements that are based on overall proportion in the eyewear frame (e.g., A/B measurements, eyewear size relative to overall width, nose bridge shape, etc.). Thereafter, the nose bridge width is resized. If one reversed this order, the nose bridge width would be affected by the global resizing after the nose bridge width had already been adjusted to the correct size, therefore changing the end resulting width of the nose bridge. It is important to note that due to employment of the rig/skin concept, each of the following steps independently result in a manifold model and can be easily deleted, interchanged or reordered without any modification to rigor model. This is typically not the case with traditional engineering CAD software, where hierarchical dependencies and stacks require dimensional or structural modifications to be thoroughly thought-out, and often planned in the original creation of the model itself, if the continuous dimensional modifications are indeed possible at all.

The following is an example of a resizing order performed by the process of FIG. 7. Initially, resize the model using a global re-scale according to the anatomical face width, so that the distance between two points (for instance on the outer most surfaces of the eyewear frame on the far right side and the far left side) corresponds to some multiple of the anatomical face width (for instance 90%). Then resize the model according to the anatomical nose bridge width measurement so that the distance between two points on nose pads (for instance in the middle of the inner surfaces) corresponds or equals the anatomical measurement. Next, calculate the edge thickness of the corrective lenses (for right side and left side) using the prescription value, lens type and the current size and shape of the eyewear for the eyewear frame in the resized model. Then resize the eyewear depth of the model according to the lens edge thickness so that the depth of the eyewear groove corresponds or equals the lens thickness.

Next, resize the model according to the anatomical nose bridge depth measurement. The distance between two points on each nose pad (right side and left side) (for instance in the middle front (away from the face) of the inner surface and the middle back (towards the face) of the inner surface should correspond or equal the anatomical measurement of the nose bridge depth.

Next, deform the model according to the anatomical pantoscopic angle measurement so that the angle from horizontal as measured along the length of the temple piece corresponds or equals the anatomical pantoscopic angle measurement.

Next, resize the model according to the anatomical temple length measurement so that the distance between two points on each temple (right and left) (for instance on the front at the joint with the front frame and the back at the start of the bend of the temple foot) corresponds or equals the anatomical temple length measurement.

Finally, output resulting manifold model as desired file type, ready for immediate manufacturing without any or with minimal manual processing or fixing.

Gathering accurate facial measurements through use of the camera on a mobile phone is a solved problem on the iPhoneX® (or any device with a depth camera) for the front of the face. However, for the profile views of the face there are no existing solutions. An embodiment of the invention first identifies the relevant points on the profile view of the face. Next, the distance between those points is determined. To solve step one, a combination of established Machine Learning algorithms and a new data set of manually annotated profile pictures are used to first determine the points required for eyewear measurements. These points are shown in FIG. 6. Step two can be determined easily if the profile pictures were taken with a depth camera. However, an embodiment works without a depth camera. To determine the distance between identified points on the profile view of the face, the known distance of the common measurement from the frontal picture is used to determine the pixel-to-actual distance conversion for each of the two profile pictures. For instance, if the nose is 25 mm long, and in the picture this distance is represented by 50 pixels, then it is assumed that the entire side of the face is at a scale of 10 mm=20 pixels. This step is independent of the subject-to-camera distance at the time of capture, thereby allowing all three pictures of front, left and right profiles to be taken at varying distances and (within reason) even with different unidentified cameras or devices. With the pixel-to-distance conversion for both profile pictures, one can determine the actual distance between each point identified in step one.

This solution for step two can be combined with a non-depth camera solution for the frontal facial measurements to create a full facial measurement solution without requiring a depth camera. For instance, if a picture of the front face has an object of known size (e.g., a credit card or a quarter coin) then the pixel-to-actual distance conversion can be determined for the frontal picture. Then, following step two as described above, the distances for profile views of the face can also be determined.

An embodiment of the invention creates custom fitted eyewear with programmatically added user customizations, such as a name, label, custom color, pattern or texture. This is a new way to manufacture individually unique product without significant cost increases. The programmatically added user customizations may be collected by client device 102, which then passes them to server 104. The bespoke eyewear module 142 incorporates the customizations into the digital file defining the 3D model for manufacturing.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer implemented method, comprising:
   receiving eyewear parameters to form received eyewear parameters;
   modifying a current computer model of eyewear in accordance with an eyewear parameter that necessitates alteration of the current computer model to form a new computer model of the eyewear, wherein the new computer model of the eyewear includes an altered hierarchical set of interconnected elements defining a rig for use with any style of eyewear frame and an altered surface representation around the rig defining a mesh that is manifold, wherein the altered surface representation is in response to modification, movement or deformation of the rig and the altered surface representation has gradients of influence with smooth deformations used to maintain the mesh that is manifold, and wherein the new computer model of the eyewear includes a global style-preserving resizing of the computer model and a local resizing of the eyewear in accordance with the eyewear parameter;
   repeating the modifying operation for each eyewear parameter of the received eyewear parameters that necessitates alteration of the new computer model to form an output manifold mesh in shape and form of a final computer model configured for manufacturing; and
   manufacturing bespoke eyewear from the output manifold mesh.

2. The computer implemented method of claim 1 wherein the received eyewear parameters include anatomical facial measurements.

3. The computer implemented method of claim 2 wherein the anatomical facial measurements are derived from an image of a face captured by a client device.

4. The computer implemented method of claim 1 wherein the received eyewear parameters include eyewear frame style parameters.

5. The computer implemented method of claim 1 wherein the received eyewear parameters include corrective lens parameters.

6. The computer implemented method of claim 1 wherein the output manifold mesh is a digital file defining a three-dimensional model for manufacturing.

7. The computer implemented method of claim 6 wherein the digital file includes programmatically added user customizations for the bespoke eyewear.

8. The computer implemented method of claim 1 wherein manufacturing is by injection molding.

9. The computer implemented method of claim 1 wherein manufacturing is by casting.

10. The computer implemented method of claim 1 wherein manufacturing is by subtractive operations.

11. The computer implemented method of claim 1 wherein manufacturing is by three-dimensional printing.

* * * * *